(12) United States Patent
Fuechsel et al.

(10) Patent No.: US 9,080,646 B2
(45) Date of Patent: Jul. 14, 2015

(54) HELICAL GEAR MECHANISM FOR A STEERING SYSTEM OF A MOTOR VEHICLE

(75) Inventors: Dennis Fuechsel, Schwaebisch Gmuend (DE); Ekkehard Kneer, Wendlingen (DE); Jens Hafermalz, Waeschenbeuren (DE); Arne Kuhlen, Ostenfelde (DE); Marco Grau, Schwaebisch Gmuend (DE)

(73) Assignee: Robert Bosch Automotive Steering GmbH, Gmuend (DE)

(*) Notice: Subject to any disclaimer, the term of this patent is extended or adjusted under 35 U.S.C. 154(b) by 487 days.

(21) Appl. No.: 13/617,139

(22) Filed: Sep. 14, 2012

(65) Prior Publication Data

US 2013/0239726 A1 Sep. 19, 2013

Related U.S. Application Data

(63) Continuation of application No. PCT/EP2011/054199, filed on Mar. 21, 2011.

(30) Foreign Application Priority Data

Mar. 26, 2010 (DE) .......................... 10 2010 003 313

(51) Int. Cl.
| | |
|---|---|
| *F16H 1/16* | (2006.01) |
| *F16H 57/039* | (2012.01) |
| *F16H 57/022* | (2012.01) |
| *F16H 57/12* | (2006.01) |
| *F16H 57/021* | (2012.01) |

(52) U.S. Cl.
CPC ................ *F16H 1/16* (2013.01); *F16H 57/039* (2013.01); *F16H 2057/0213* (2013.01); *F16H 2057/0222* (2013.01); *F16H 2057/127* (2013.01); *Y10T 74/19828* (2015.01)

(58) Field of Classification Search
CPC ................ F16H 1/26; F16H 2057/127; F16H 2057/0222; F16H 1/16
See application file for complete search history.

(56) References Cited

U.S. PATENT DOCUMENTS

| | | | |
|---|---|---|---|
| 6,761,244 B2 | 7/2004 | Sano et al. | |
| 7,048,088 B2 | 5/2006 | Bernhard et al. | |
| 2003/0146039 A1 | 8/2003 | Sano et al. | |
| 2004/0222036 A1 | 11/2004 | Berhard et al. | |
| 2007/0205039 A1* | 9/2007 | Imagaki et al. | 180/444 |
| 2009/0255751 A1* | 10/2009 | Kondo et al. | 180/444 |
| 2010/0260448 A1* | 10/2010 | Hafermalz et al. | 384/215 |
| 2010/0319475 A1 | 12/2010 | Fuechsel | |

FOREIGN PATENT DOCUMENTS

| | | |
|---|---|---|
| DE | 101 61 715 | 6/2003 |
| DE | 10 2004 054 510 | 5/2006 |

(Continued)

*Primary Examiner* — William Kelleher
*Assistant Examiner* — Terence Boes
(74) *Attorney, Agent, or Firm* — Jordan and Hamburg LLP

(57) ABSTRACT

A helical gear mechanism for a steering system in a motor vehicle comprises a helical pinion which engages with a helical gear and a bearing bushing which accommodates a bearing of the helical pinion. An inner ring of the bearing bushing is connected to an outer ring via a pivot bearing so that a pivoting motion of the helical pinion relative to the helical gear is possible. A pressure piece is disposed between the inner ring and the outer ring of the bearing bushing. The pressure piece is movable in a spring-loaded manner in a section of an annular gap between the inner ring and the outer ring. The inner ring and/or the outer ring are designed in the section so that the annular gap between the inner ring and the outer ring is tapered in the direction in which the pressure piece can be moved in a spring-loaded manner.

10 Claims, 9 Drawing Sheets

(56) References Cited

FOREIGN PATENT DOCUMENTS

| DE | 10 2008 000 506 | 9/2009 |
| DE | 10 2008 001 878 | 11/2009 |
| DE | 10 2008 042 281 | 3/2010 |
| EP | 1 225 116 | 7/2002 |
| EP | 1 760 368 | 3/2007 |

* cited by examiner

HELICAL GEAR MECHANISM FOR A STEERING SYSTEM OF A MOTOR VEHICLE

This is a Continuation of PCT/EP2011/054199 Filed Mar. 21, 2011.

BACKGROUND OF THE INVENTION

The invention relates to a helical gear mechanism, and more particularly to a worm gear mechanism. The invention further relates to an electric power steering system, comprising a helical gear mechanism.

A helical gear mechanism of the type in question in form of a worm gear mechanism for use in an electric power steering system is known from DE 101 61 715 A1.

The worm gear mechanism described in DE 101 61 715 A1 is disposed in a housing and comprises a worm and a worm gear. The worm is connected to the drive shaft of an electric drive motor by means of a coupling. In the construction shown there, the worm can be pivoted perpendicularly relative to the axis of rotation and is mounted in a pivot or swivel bearing, whereby the interlocking play can be kept constant during the entire lifetime of the gear mechanism. For this purpose, the worm is prestressed radially and is permanently pushed against the toothing of the worm gear (or of the helical gear). It has been found with such constructions that changes in the direction of rotation or load changes in the gear mechanism, together with existing tooth flank play, can cause the tooth flanks of the helical pinion or of the worm to strike against the tooth flanks of the helical gear or worm gear and cause noise. Nonetheless, the tooth flank play should not be set too low during installation because this can negatively impact the efficiency and wear of the gear mechanism. Moreover, this can worsen the feedback properties of a power steering system, which in turns worsens the driver's steering sensation.

The maximum prestress with which the worm can be pushed into the worm gear is limited as the worm gear mechanism would otherwise jam.

The helical gears or worm gears used in electric steering systems are frequently produced from plastic materials. Over a lifetime, these plastic parts are subject to settling and/or wear. So as to ensure the spring loading of the worms against the worm gear over the entire lifetime, a very high spring-loading force is applied in helical gear mechanisms or worm gear mechanisms known from the general prior art when they are new, this force decreasing over the course of the lifetime because the interlocking play increases. In the new state, this creates increased friction and consequent drawbacks in terms of the efficiency in the gear mechanism.

Reference is also made to DE 10 2008 000 506 A1 with regard to the additional prior art.

SUMMARY OF THE INVENTION

It is the object of the present invention to eliminate the aforementioned drawbacks of the prior art, and more particularly to create a simple solution that is cost-effective to implement, in which the friction in the gear mechanism is minimized, improved efficiency can be achieved, the spring-loading force is constant to as great an extent as possible over a lifetime, and undesirable noise development in the gear mechanism is substantially reduced.

The solution according to the invention results in minimized friction in the gear mechanism and increases the efficiency, because continuous spring loading with a substantially constant spring-loading force is achieved throughout the entire lifetime. It is not necessary to apply a very high spring-loading force when the system is new. In addition, rattling or annoying noise is prevented, or substantially reduced, over the entire lifetime due to the continuous spring loading with a substantially constant spring-loading force. Because of the simple design of the solution according to the invention, the installation requirements are reduced. It is particularly advantageous that no settings are required during installation for the spring loading of the helical pinion or the worm, because the required spring loading is automatically established by the solution according to the invention.

The solution according to the invention increases the robustness of the helical gear mechanism and consequently of the entire power steering system. Due to the automatic compensation of center distance variations resulting from the invention, only minor spring-loading forces are required.

The solution according to the invention allows for tolerance, wear and temperature compensation in the toothing engagement between the helical pinion and the helical gear over an entire lifetime.

The solution according to the invention particularly advantageously separates a function "which implements the basic play", so as to compensate in particular for temperature-related expansions and concentricity tolerances, and a function "which implements adjustment", so as to allow particular adjustments which are required, for example, due to settling or wear in the toothing components.

The helical gear mechanism according to the invention for a steering system in a motor vehicle, preferably for an electric steering system, and more particularly for an electric power steering system of a motor vehicle, comprises a helical pinion which engages with a helical gear.

According to the invention, a bearing of the helical pinion is mounted in a bearing bushing. The bearing, which is accommodated by the bearing bushing, is preferably disposed at the end, or in an end region, of the helical pinion. According to the invention, an inner ring of the bearing bushing is connected to an outer ring of the bearing bushing via a pivot bearing, so that a pivoting motion of the helical pinion relative to the helical gear is possible. A pressure piece is disposed between the inner ring and the outer ring of the bearing bushing for this purpose. The pressure piece can be moved in a spring-loaded manner in a section of an annular gap between the inner ring and the outer ring wherein, in the section in which the pressure piece can be moved, the inner ring and/or the outer ring are designed so that the annular gap between the inner ring and the outer ring is tapered in the direction in which the pressure piece can be moved in a spring-loaded manner.

By virtue of the solution according to the invention, the pressure piece adjusts automatically as needed, whereby any offset or wear in the toothing components is compensated for. This is achieved in that the pressure piece, which is spring loaded according the invention, is pushed into the tapering annular gap between the inner ring and the outer ring as soon as the annular gap, which is to say the distance in the radial direction between the inner ring and the outer ring, has reached a size which allows the pressure piece to penetrate. An increase in the annular gap, or an increase in the height of the annular gap, which results from the distance between the inner ring and the outer ring, can occur when the helical gear and the helical pinion move toward each other, or the distance from each other decreases. To this end, the pressure piece is preferably disposed in an angular region of the inner ring facing away from the helical gear. In this region, the annular gap is significantly increased when the helical pinion further approaches the helical gear.

The spring-loaded adjustment of the pressure piece in the annular gap ensures that at least a portion of the surface of the pressure piece is clamped between the inner ring and the outer ring when the helical gear mechanism is operated. The pressure piece can be produced from a suitable material, preferably an elastomer, which generates a special spring characteristic under load. In addition, or as an alternative to the material properties, this spring characteristic can also be implemented or supported by the geometry of the components, such as grooves, lands, openings, cavities and the like. It is advantageous to design the spring characteristic so that the force changes little at the beginning of the characteristic with small travel, and then the force changes very dramatically with small travel (progressive characteristic). This ensures that the radial run-out and thermal expansion of the components of the helical gear mechanism do not increase the friction in the gear mechanism. The progressive characteristic additionally prevents the helical pinion from migrating out of the toothing of the helical gear. As an alternative, or in addition to producing the pressure piece from a suitable material, it is also possible to produce at least the surfaces of the inner ring and/or of the outer ring, with which the pressure piece is in contact, from a suitable material, preferably an elastomer, which has a characteristic under load that is suitable to assure the basic play. For this purpose, the surfaces of the inner ring or of the outer ring may also be provided with suitable lands, grooves, openings, cavities or the like, which create or support the elastic property.

According to the invention, it is thus possible for the basic play to be ensured by the pressure piece and/or by the adjoining surfaces of the inner ring and/or outer ring, the basic play allowing the expansions and the concentricity tolerances of the components of the helical gear mechanism to be compensated for. It is advantageous if the basic play has a precisely defined lower limit and a precisely defined upper limit, which should not be dropped below, or exceeded, if possible.

As soon as the height of the annular gap (radial distance between inner ring and outer ring) becomes too large, due to wear or the like, and the pressure piece can no longer fulfill its function in terms of the basic play, the pressure piece is moved by the spring load, in the circumferential direction, inside the annular gap, on an at least substantially approximately circular or annular path between the inner ring and the outer ring, so that the pressure piece penetrates further into the tapering annular gap or enters so far until the pressure piece is once again clamped in the annular gap between the outer circumference of the inner ring and the inner circumference of the outer ring. The pressure piece can thus once again fulfill its function in terms of the basic play.

The solution according to the invention thus allows play in the helical gear mechanism, which can develop, for example, due to settling/wear/component tolerances, to be adjusted or compensated for so that the pressure piece ensures that a precisely defined force acts on the helical pinion in the direction of the helical gear, in all operating states.

It is advantageous if the inner ring and/or the outer ring has a sloped or stepped contact surface at least in a portion of the section in which the pressure piece can be moved in a spring-loaded manner.

By creating a sloped or stepped contact surface, a preferably continuous or uniform tapering of the annular gap is achieved in a simple manner.

A sloped or stepped contact surface shall be understood to mean that the outer ring and/or the inner ring in this section deviate from a substantially circular shape.

It is advantageous if the pressure piece has a contact surface that is adapted to the contact surface of the inner ring or outer ring and has a corresponding sloped or stepped course.

This design allows the pressure piece to penetrate particularly easily in the tapering annular gap or to slide along the fixed sloped or stepped contact surface of the outer ring or inner ring.

The pressure piece thus forms a movable sloped contact surface, while the inner ring or the outer ring has a fixed sloped contact surface.

The fixed sloped surface can preferably be formed on the outer ring. However, it is also possible to form the fixed sloped surface on the inner ring, or on both rings.

When the sloped or stepped contact surfaces meet each other, they slide against each other. The inner ring then carries out a pivoting motion, whereby the helical pinion is pushed into the helical gear. The pressing force is dependent on the angle of the sloped contact surfaces and the spring force with which the pressure piece is spring-loaded.

It is advantageous for the pressure piece to be displaceably guided on a guide path on the outer circumference of the inner ring or on the inner circumference of the outer ring. To this end, the guide path advantageously enables a positive connection between the pressure piece and the inner ring or outer ring, but allows a displacement of the pressure piece in the circumferential direction between the rings. The positive connection between the inner ring or outer ring and the pressure piece allows the pressure piece, which is guided in the annular gap, to carry out an angular motion on an annular path. The positive connection can be present only on a segment of a circle of the outer ring or inner ring, or around the entire periphery on the respective ring.

Advantageously a spring is provided, preferably an annular spring, with one end of the spring engaging on the inner ring or outer ring and the other end engaging on the pressure piece. To this end, the spring preferably engages on the ring (inner ring or outer ring) on the guide path of which the pressure piece is displaceably guided.

Advantageously a safety pin is provided, which immovably fixes the pressure piece relative to the inner ring or the outer ring. The spring can thus be prevented from displacing the pressure piece before the helical gear mechanism is installed. The safety pin is only removed after the helical gear mechanism assembly has been completely installed, or only when desired. When the safety pin is removed, the tensioned spring moves the pressure piece on the annular path toward the fixed sloped surface (of the outer ring and/or of the inner ring), whereby the inner ring is pivoted in the direction of the helical gear. This establishes zero play in the gear mechanism which is composed of the individual parts, which are subject to tolerances. When wear develops, the pressure piece is pushed forward by the spring and the play-free state continues to be provided.

The ring which is provided with the guide path is advantageously connected to the pressure piece by means of the safety pin. It is further advantageous if the safety pin protrudes from the housing of the helical gear mechanism even after all gear mechanism components have been installed, so that the safety pin can be easily removed.

The pressure piece and/or the contact surface of the inner ring and/or of the outer ring are advantageously produced from an elastomer. The basic play can thus be implemented in a particularly simple manner.

It is further advantageous if the pressure piece and/or the contact surface of the inner ring and/or of the outer ring have grooves and/or openings and/or cavities and/or lands. This simplifies the creation of the basic play. Lands, openings, grooves or cavities, for example, facilitate spring deflection. For this purpose, the pressure piece and/or the contact surface may also be produced from elastomers having differing hardness levels (soft components and hard components).

The pressure piece advantageously acts on the helical pinion via the inner ring in a region, or in an angular section, that faces away from the helical gear. It is further advantageous for the pivot bearing, which connects the outer ring of the bearing bushing to the inner ring, to be located on a radial line of the helical pinion, which runs substantially parallel to the axis of the helical gear. To this end, it may be advantageous for a stop to be formed in an angular section of the annular gap between the inner ring and the outer ring, which is located opposite (which is to say rotated by 180°) the annular gap in which the pivot bearing is disposed, the stop substantially preventing a movement of the inner ring in this direction. The ability of the inner ring to move in the direction of the outer ring is preferably reduced by one tenth of a millimeter at this location.

A second bearing is preferably provided for mounting the helical pinion, the second bearing preferably mounting the helical pinion at the other end. The use of a fixed bearing is advantageous for this purpose, which preferably allows a small pivoting angle, so that the pivoting motion of the helical pinion caused by the inner ring of the bearing bushing is not impeded. The helical pinion is preferably mounted on the fixed bearing side by a rolling bearing.

The helical gear mechanism is advantageously designed as a worm gear mechanism, wherein the helical gear is designed as a worm gear and the helical pinion is designed as a worm, and wherein the worm is engaged with the worm gear.

It is further advantageous to implement an electric power steering system for motor vehicles with a helical gear mechanism or a worm gear mechanism which has one or more features of the above-described helical gear mechanism or worm gear mechanism.

Advantageous embodiments will be apparent from the additional dependent claims. An exemplary embodiment of the invention is shown schematically hereafter based on the drawings.

DESCRIPTION OF THE PREFERRED EMBODIMENT

The basic design of a helical gear mechanism, or a worm gear mechanism, notably for the use thereof in an electric power steering system for motor vehicles, is sufficiently known from the general prior art, for which purpose reference is made to DE 101 61 715 A1 and DE 10 2008 000 506 A1, for example; accordingly, hereafter only the features that are essential for the invention will be described in greater detail.

Within the scope of the invention and the exemplary embodiment described hereafter, a worm gear mechanism shall be regarded as being disclosed analogously by the disclosure of the invention based on a helical gear mechanism. For these purposes, the helical pinion corresponds to the worm and the helical gear corresponds to the worm gear.

Figure 1:
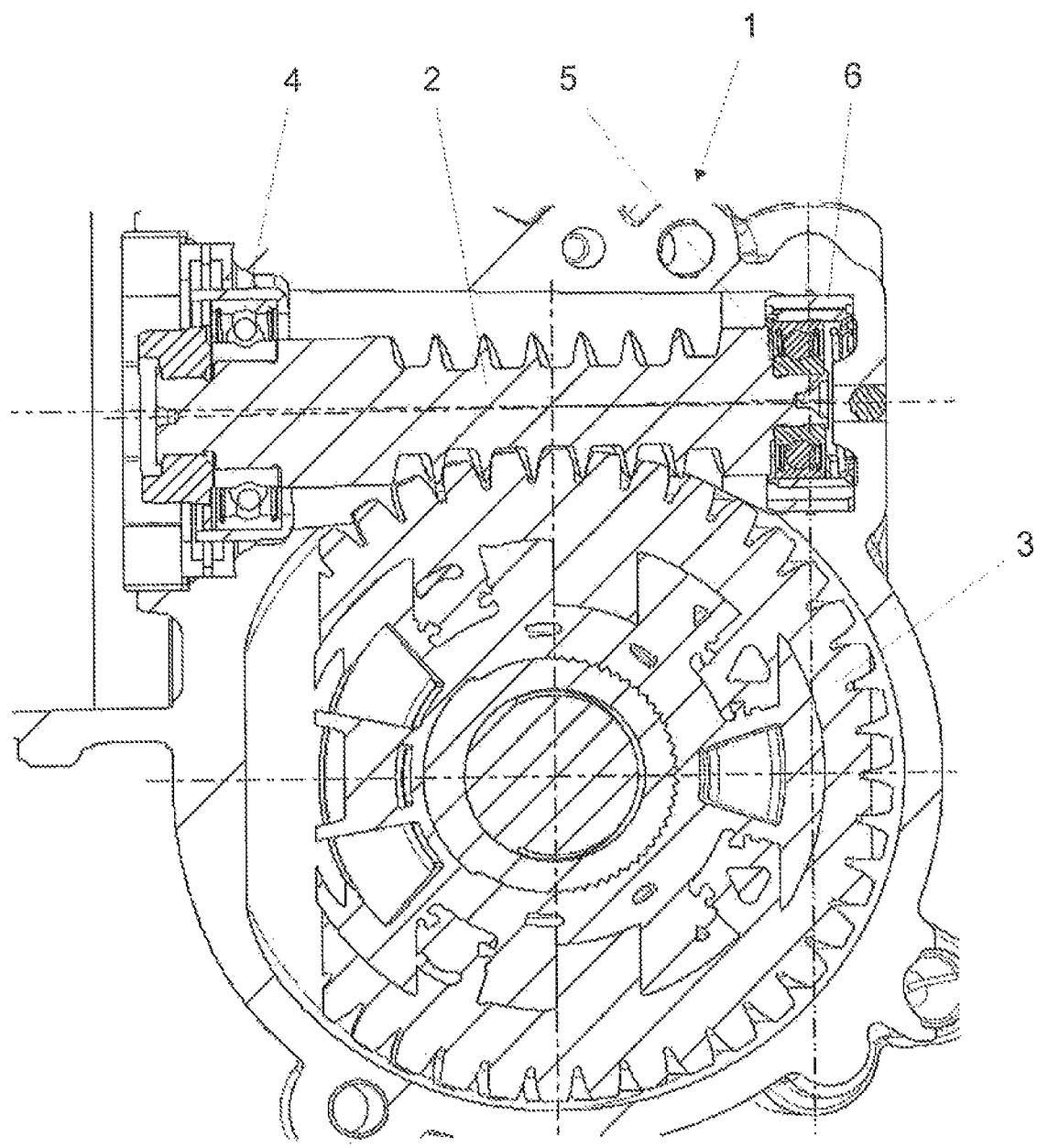
FIG. 1 shows a schematic design of a helical gear mechanism.

FIG. 1 shows a helical gear mechanism 1 of a steering system, which is not shown in detail, and more particularly of an electric power steering system of a motor vehicle. The helical gear mechanism 1 comprises a helical pinion 2, which engages with a helical gear 3. The helical gear 3 is produced from plastic material in the exemplary embodiment.

The helical pinion 2 is mounted on the fixed bearing side by a rolling bearing 4, which allows a small pivot angle. At this end, the helical pinion 2 can be connected via a coupling to a drive shaft of an electric drive motor. The other end of the helical pinion 2 is mounted in a floating bearing 5. In the exemplary embodiment, the floating bearing 5 is likewise implemented by a rolling bearing. The outer ring of the rolling bearing 5 is radially fixed in a bearing bushing 6 which adjusts according to the invention. To this end, the bearing bushing 6 can be pivoted in the direction of the helical gear 3. Via the rolling bearing 5 and the adjusting bearing bushing 6, the helical pinion 2 is pushed with a predetermined pressure into the toothing of the helical gear 3 by a spring-loaded pressure piece 7 (refer to FIGS. 2 to 9). As is apparent in detail from FIGS. 2 to 9, the pressure piece 7 is disposed between an inner ring 8 and an outer ring 9 of the bearing bushing 6.

The helical pinion 2 and the helical gear 3 are mounted in a housing 10. As is apparent in detail from FIGS. 2 to 9, the outer ring 9 of the bearing bushing 6 is pressed into the housing 10. The inner ring 8 of the bearing bushing 6 accommodates the rolling bearing 5.

Figure 4:
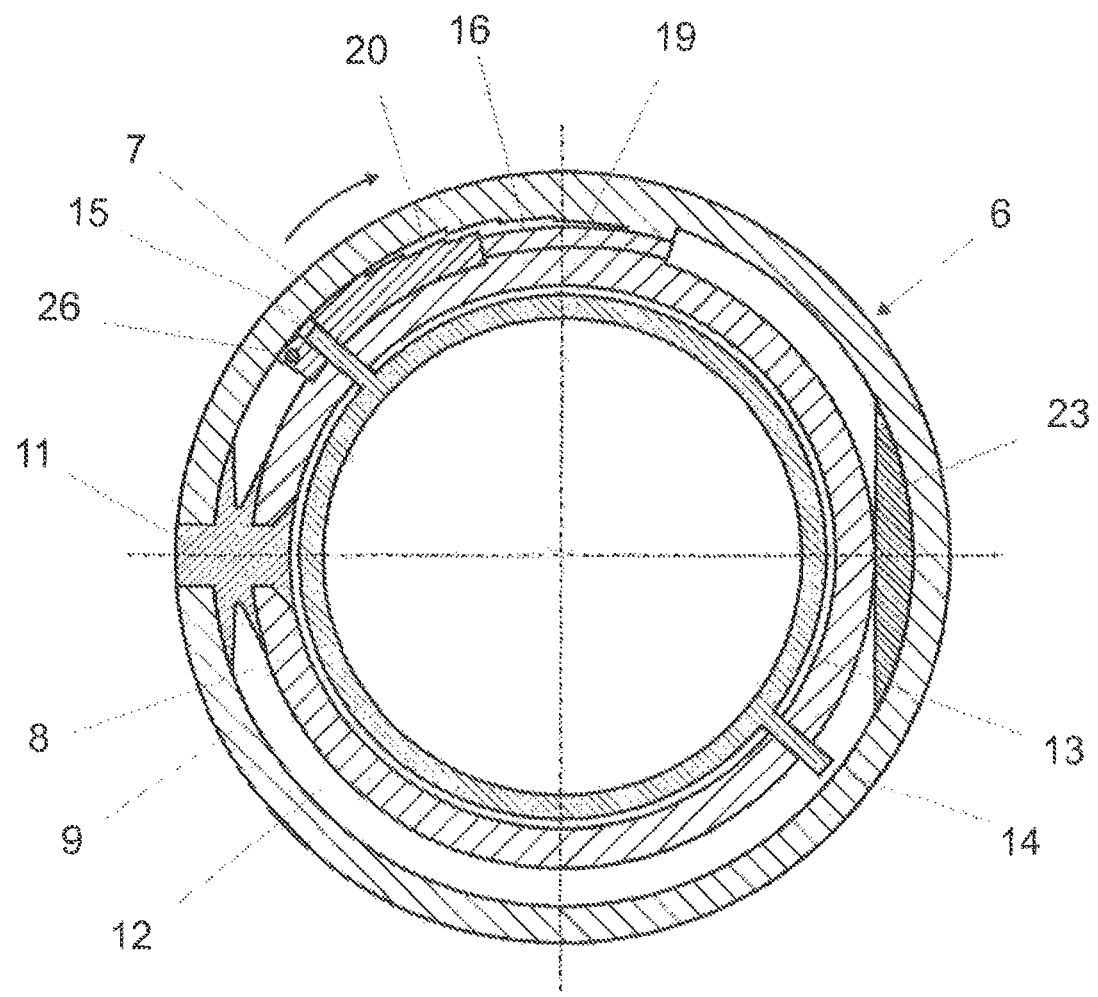
FIG. 4 is a schematic representation of the bearing bushing according to the invention.
Figure 5:
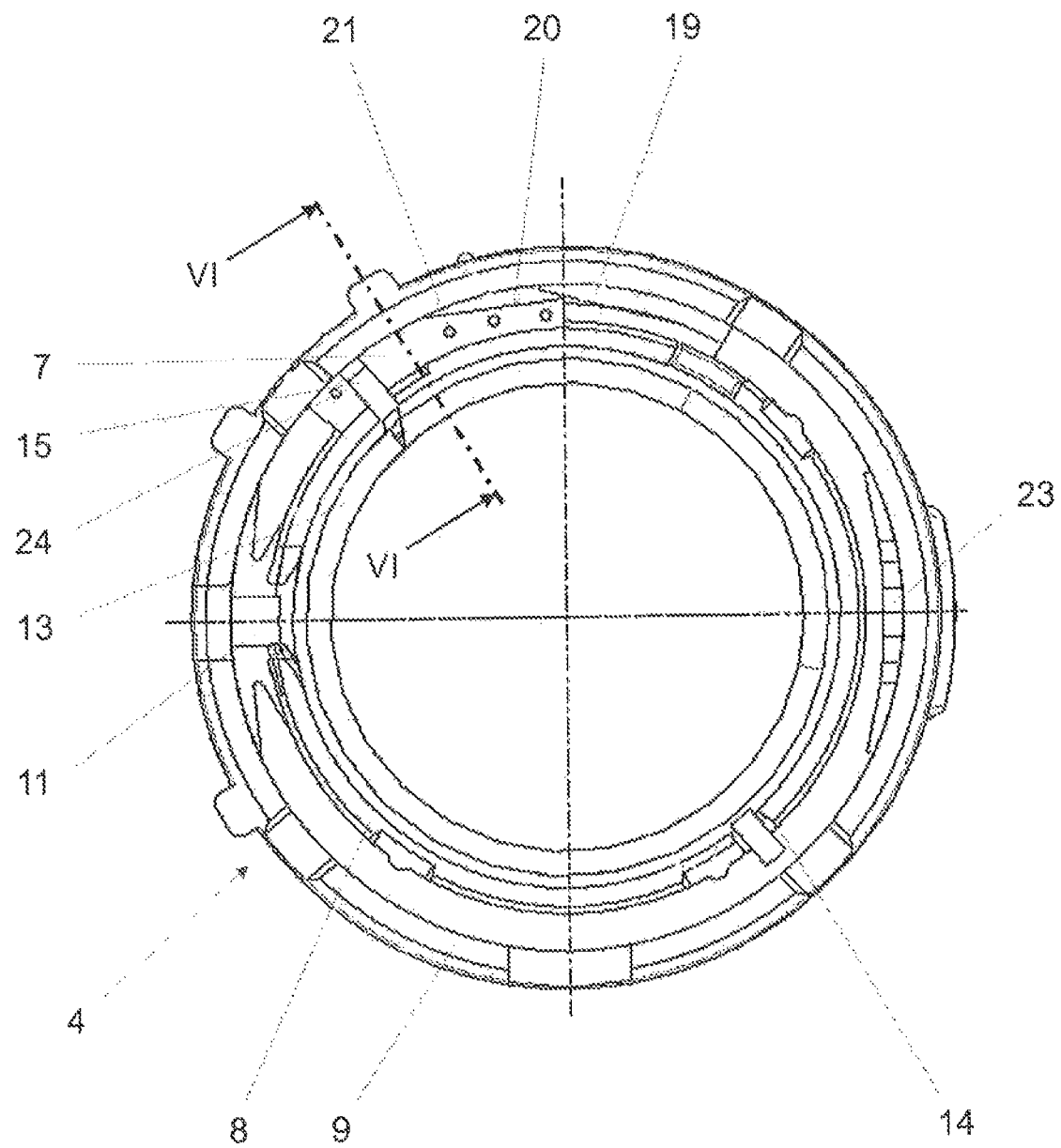
FIG. 5 is a detailed representation of the bearing bushing according to the invention.
Figure 6:
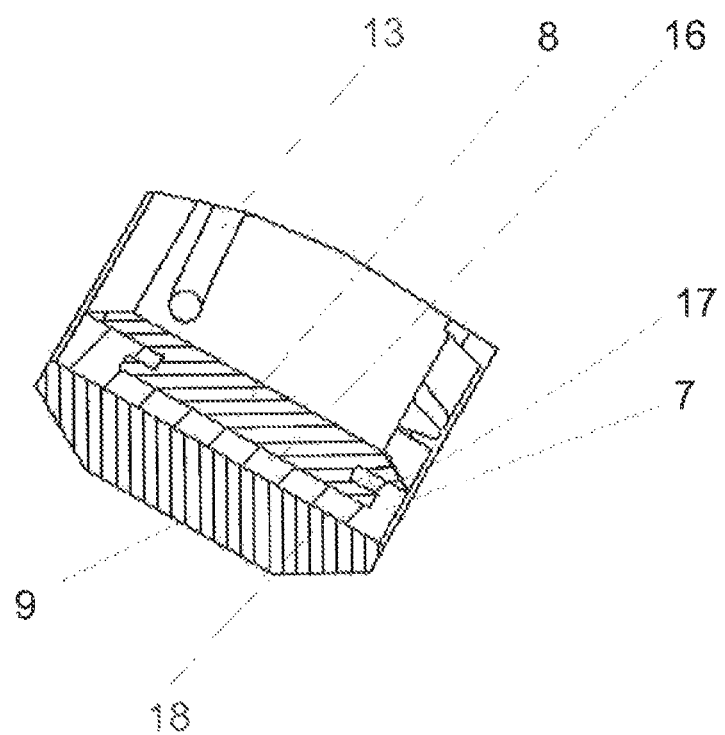
FIG. 6 is a section according to line VI-VI of FIG. 5.
Figure 7:
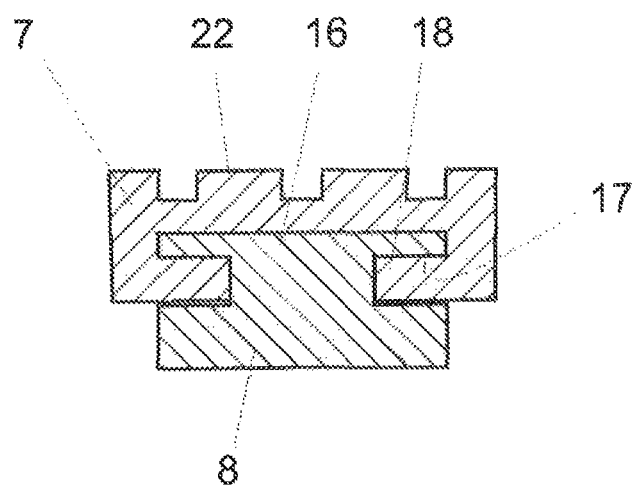
FIG. 7 is a cross-section through an inner ring of the bearing bushing having a guide path for the pressure piece.

The inner ring 8 and the outer ring 9 are connected via a pivot bearing 11 (refer to FIG. 4 and FIG. 5). The pivot bearing 11 allows a pivoting motion of the helical pinion 2 toward the helical gear 3. The pivot bearing 11 is disposed between the inner ring 8 and the outer ring 9 and is rotated 90° about the rotational axis of the helical gear 3 relative to the contact point of the pressure piece 7.

In an especially simple embodiment, the pivot bearing 11 can be designed as a pivot point. However, it has been found to be advantageous for the pivot bearing 11 to have a shape such as that which is shown schematically in FIG. 4, and in detail in FIG. 5. This creates a particularly good and stable connection between the inner ring 8 and the outer ring 9. In the exemplary embodiment, the pivot bearing 11 is located on a radial line of the bearing bushing 6 which runs substantially parallel to the axis of the helical gear 3 (which is to say perpendicularly to the drawing plane in FIG. 1).

Figure 2:
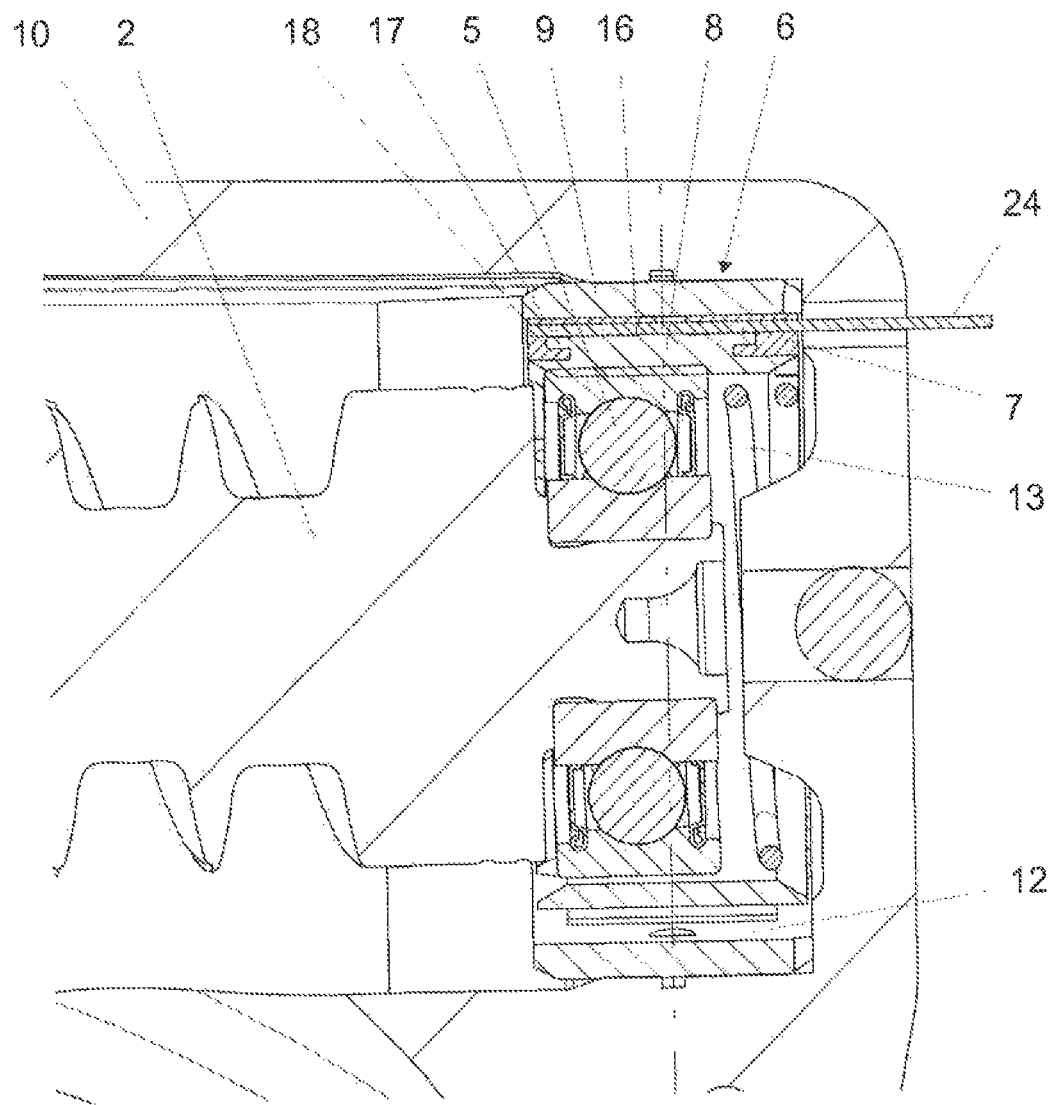
FIG. 2 shows an enlarged section through the end of the helical pinion which is mounted in the bearing bushing according to the invention.
Figure 3:
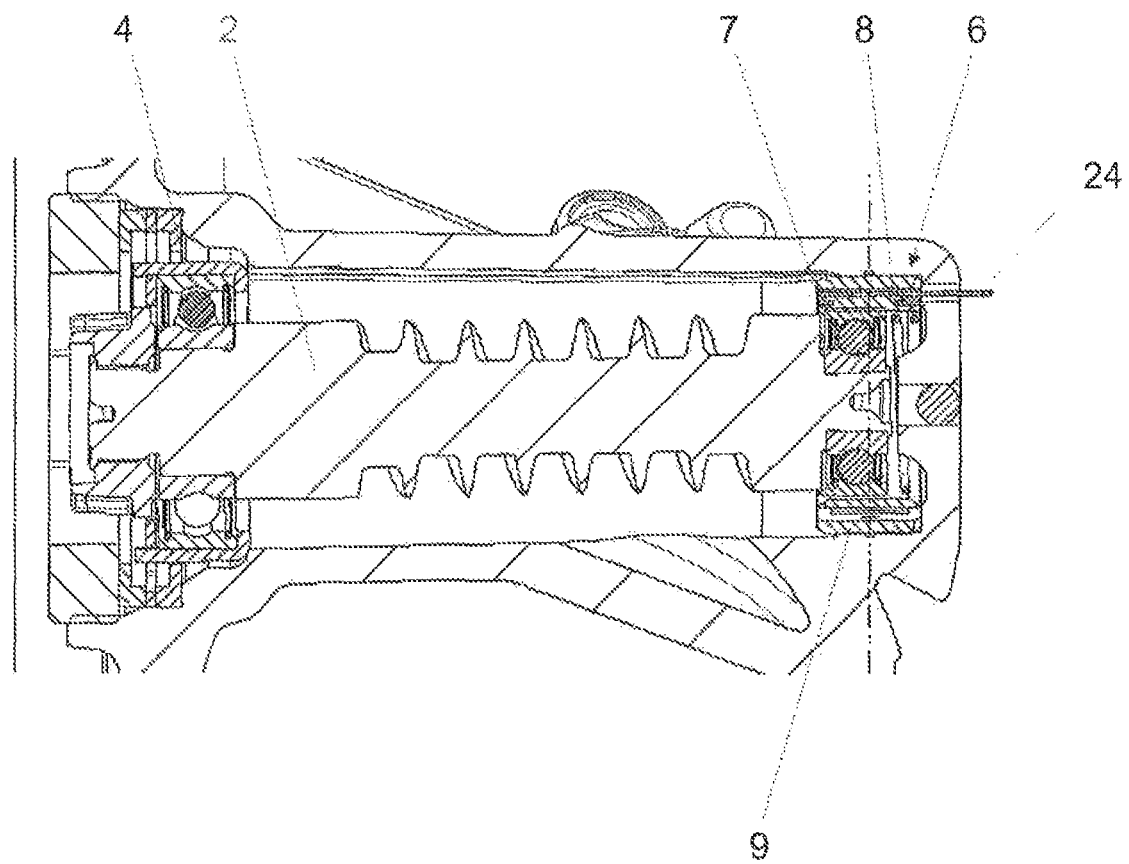
FIG. 3 shows a section through the helical pinion comprising the bearing bushing according to the invention.

The arrangement of the pressure piece 7 between the inner ring 8 and the outer ring 9 of the bearing bushing 6 is apparent in particular from FIGS. 2, 4 and 5. The pressure piece 7 is located in an annular gap 12 between the inner ring 8 and the outer ring 9. The pressure piece 7 is located in an angular region between the inner ring 8 and the outer ring 9 which faces away from the helical gear 3, so that the distance variations between the helical pinion 2 and the helical gear 3, such as those caused by settling or wear, significantly affect the annular gap 12, and more particularly the height thereof, which is to say the distance between the inner ring 8 and the outer ring 9.

As is further apparent in particular from FIGS. 4 and 5, the annular gap 12 is tapered in a direction in which the pressure piece 7 can move in a spring-loaded manner. The direction of movement of the pressure piece 7 is shown by the arrow in FIG. 4. Because of the spring loading, the pressure piece 7 is forced to penetrate in the annular gap 12. However, the pressure piece 7 can only penetrate into the annular gap 12 until the pressure piece 7 is clamped between the inner ring 8 and the outer ring 9. The pressure piece 7 can be pushed further forward into the tapering annular gap 12 under the spring load only if settling or wear between the helical pinion 2 and the helical gear 3 increase the annular gap 12 in the section in which the pressure piece 7 is disposed. As soon as the pressure piece 7 is again clamped between the inner ring 8 and the outer ring 9, the movement is stopped.

As is apparent from FIGS. 4 and 5, a force is applied to the pressure piece 7 by a spring, which in the exemplary embodiment is an annular spring 13. In the exemplary embodiment, the annular spring 13 is tensioned by one end of the annular spring 13 being latched into the pressure piece 7 and the other end being latched into the inner ring 8. The latching of the annular spring 13 takes place in the exemplary embodiment in that one end of the tensioned annular spring 13 latches in a groove 14 of the inner ring 8 and the other end of the annular spring 13 is pushed in a groove 15 of the pressure piece 7. The spring force causes the ends of the annular spring 13 to be seated against a groove side, whereby the annular spring 13 is held in the adjusting bearing bushing 6.

Figure 8:
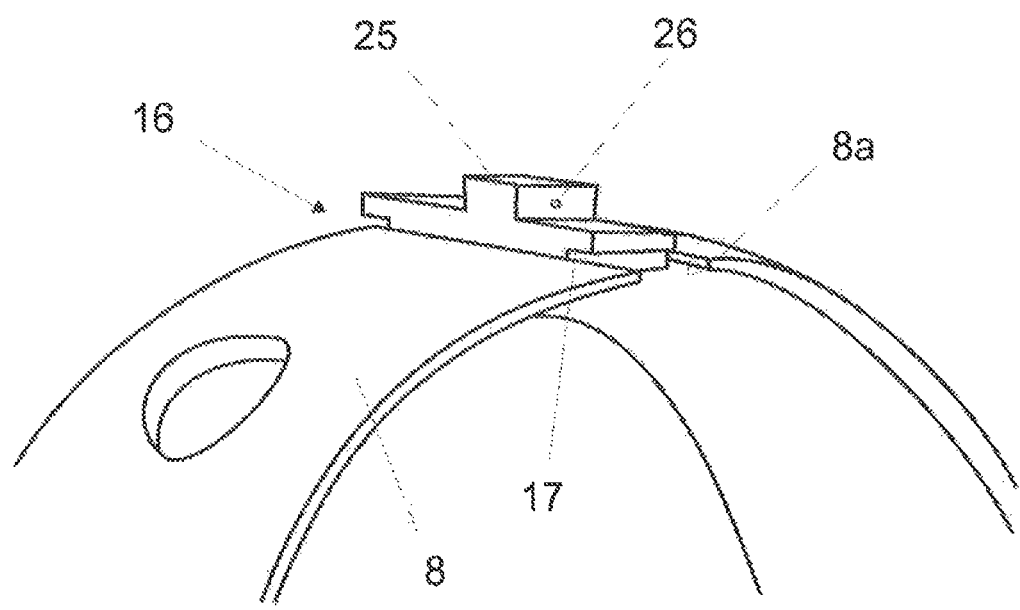
FIG. 8 is a perspective representation of a section of the inner ring having the guide path for the pressure piece.
Figure 9:
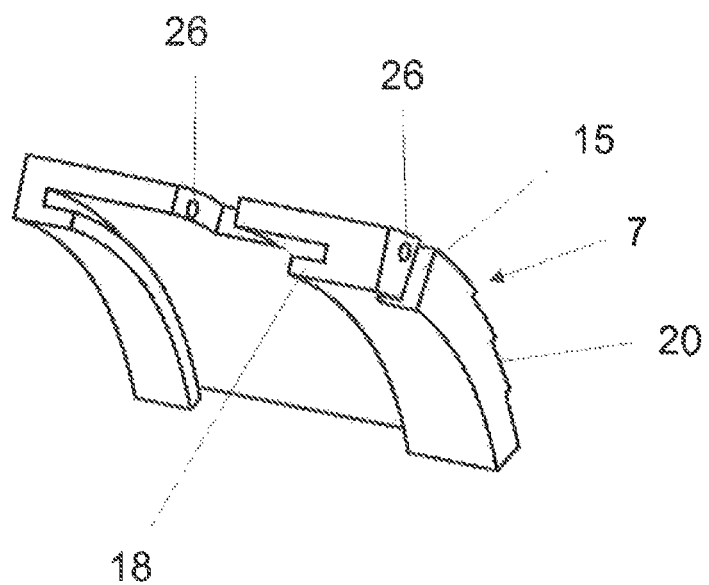
FIG. 9 is a perspective representation of the pressure piece from beneath.

As is apparent from FIG. 8, the inner ring 8 has a recess 8a, which allows one end of the annular spring 13 to be latched in the groove 15 of the pressure piece 7, without impeding the movement of the pressure piece 7.

As is apparent from FIGS. 2 to 9, the pressure piece 7 is displaceably guided on a guide path 16 of the inner ring 8 in the circumferential direction. The guide path 16 allows a positive connection between the pressure piece 7 and the inner ring 8. In the exemplary embodiment, this is a tongue-and-groove connection. A groove 17 of the tongue-and-groove connection is formed by the guide path 16 of the inner ring 8 (refer to FIGS. 6, 7, and 8). A tongue 18 of the tongue-and-groove connection is formed in a corresponding manner on the lower face of the pressure piece 7 (refer to FIGS. 6, 7, and 9). The positive connection between the pressure piece 7 and the inner ring 8, or the guide path 16, runs on an annular path or extends over a portion of the outer circumference of the inner ring 8.

As is apparent in particular from FIG. 4 and FIG. 5, the outer ring 9 has a sloped (or alternately a stepped) contact surface 19, at least in a portion of the section in which the pressure piece 7 can be moved in a spring-loaded manner. In the exemplary embodiment, a sloped contact surface 19 is provided, which is shown with steps in FIG. 4 merely for illustration. The sloped contact surface 19, by which the outer ring 9 deviates from a circular shape on the inner side, is achieved by tapering the annular gap 12 in a direction in which the pressure piece 7 can be moved in a spring-loaded manner. The pressure piece 7 has a contact surface 20 which is adapted to the contact surface 19 and has a corresponding sloped (or alternatively a stepped) design. In the exemplary embodiment a sloped contact surface 20 is provided, which is shown with steps in FIG. 4 and FIG. 9 merely for illustration.

In the exemplary embodiment, the guide path 16 is formed on the inner ring 8 and the contact surface 19 is formed on the outer ring 9. However, this can also be implemented in exactly the reverse manner and shall hereby analogously be disclosed in the exemplary embodiment, including all the described features.

In the exemplary embodiment, the pressure piece 7 together with the contact surface 20 and the contact surface 19 of the outer ring 9 are produced from an elastomer. The elastic properties of these elastomers make the basic play possible, which is to say the elastic properties of the pressure piece and of the contact surfaces 19 and 20 make it possible, for example, to compensate for temperature-related expansions and concentricity tolerances of the helical gear mechanism 1. The elastic properties of the pressure piece 7 and of the contact surfaces 19, 20 can be supported by providing cavities 21 (refer to FIG. 5) or lands 22 (refer to FIG. 7) in the pressure piece 7 and/or contact surfaces 19, 20. As an alternative, it is also possible to provide openings, grooves or the like.

As is apparent from FIG. 4 and FIG. 5, a stop 23 is inserted in the annular gap 12 between the inner ring 8 and the outer ring 9, in a region located opposite the pivot bearing 11. The stop 23 is thus located on a radial line of the bearing bushing 6 which runs substantially parallel to the axis of the helical gear 3. The outer ring 9 has a receptacle or a borehole in which the stop 23 can be inserted. The stop 23 reduces the annular gap 12 between the inner ring 8 and the outer ring 9 to the extent that the inner ring 8 cannot significantly move in the direction of the outer ring 9 in this region. In total, the pivot bearing 11 and the stop 23 thus substantially suppress a movement of the inner ring 8 in the axial direction of the helical gear 3 or in the transverse direction relative to the desired pivoting motion. The movement of the inner ring 8 is thus substantially reduced to the desired pivoting motion, which is predetermined by the pivot bearing 11 and which makes it possible for the helical pinion 2 to move in the direction of the helical gear 3.

As is apparent in particular from FIGS. 2, 3, 4, 8 and 9, a safety pin 24 is provided, which immovably fixes the pressure piece 7 relative to the inner ring 8. The safety pin 24 protrudes over the housing 10. The safety pin 24 fixes a "non-active position", which is to say the as-delivered condition. The safety pin 24 prevents the pressure piece 7 from being displaced by the annular spring 13. As is apparent from FIG. 4, FIG. 8 and FIG. 9, the pressure piece 7 and the inner ring 8 (on a projecting lug 25 of the guide path 16 thereof) have boreholes 26 into which the safety pin 24 can be pushed.

LIST OF REFERENCE NUMERALS 1 helical gear mechanism
2 helical pinion
3 helical gear
4 rolling bearing (fixed bearing side)
5 rolling bearing (floating bearing side)
6 bearing bushing
7 pressure piece
8 inner ring
8a recess of the inner ring 8
9 outer ring
10 housing
11 pivot bearing
12 annular gap
13 annular spring
14 groove (inner ring 8)
15 groove (pressure piece 7)
16 guide path (of 8)
17 groove (of the tongue-and-groove connection)
18 tongue (of the tongue-and-groove connection)
19 contact surface (of the outer ring 9)
20 contact surface (of the pressure piece 7)
21 cavities
22 lands 23 stop
24 safety pin
25 lug of the guide path 16
26 boreholes for the safety pin

The invention claimed is:

1. A helical gear mechanism for a steering system of a motor vehicle, comprising a helical pinion, which engages with a helical gear, a bearing bushing which accommodates a bearing of the helical pinion, an inner ring of the bearing bushing is connected via a pivot bearing to an outer ring of the hearing bushing so that a pivoting motion of the helical pinion relative to the helical gear is possible, a pressure piece disposed between the inner ring and the outer ring of the bearing bushing wherein the pressure piece can he moved in a spring-loaded manner in a section of an annular gap between the inner ring and the outer ring, wherein the inner ring and/or the outer ring in the section are designed so that the annular gap between the inner ring and the outer ring is tapered in the direction in which the pressure piece can be moved in a spring-loaded manner.

2. The helical gear mechanism according to claim 1, wherein the inner ring and/or the outer ring have a sloped or stepped contact surface, at least in a portion of the section in which the pressure piece can be moved in a spring-loaded manner.

3. The helical gear mechanism according to claim 2, wherein the pressure piece has a contact surface which is adapted to the contact surface of the inner ring or of the outer ring and has a corresponding sloped or stepped design.

4. A helical gear mechanism according to claim 1, wherein the pressure piece can be displaceably guided on a guide path on the outer circumference of the inner ring or on the inner circumference of the outer ring.

5. The helical gear mechanism according to claim 4, wherein the guide path allows a positive connection between the pressure piece and the inner ring or the outer ring.

6. A helical gear mechanism according to claim 1, wherein a spring is provided, wherein one end of the spring engages on the inner ring or outer ring and the other end engages on the pressure piece.

7. A helical gear mechanism according to claim 1, wherein a safety pin is provided, which immovably fixes the pressure piece relative to the inner ring or the outer ring.

8. A helical gear mechanism according to claim 2, wherein the pressure piece and/or the contact surface of the inner ring and/or of the outer ring are produced from an elastomer.

9. A helical gear mechanism according to claim 1, wherein the pressure piece and/or the contact surface of the inner ring and/or of the outer ring comprise grooves and/or openings and/or cavities and/or lands.

10. An electric power steering system for motor vehicles, comprising a helical gear mechanism according to claim 1.

* * * * *